Dec. 1, 1970  F. G. VON BRECHT ET AL  3,543,478
PLASTIC FILM PACKAGING MACHINE
Filed Feb. 14, 1968  5 Sheets-Sheet 1
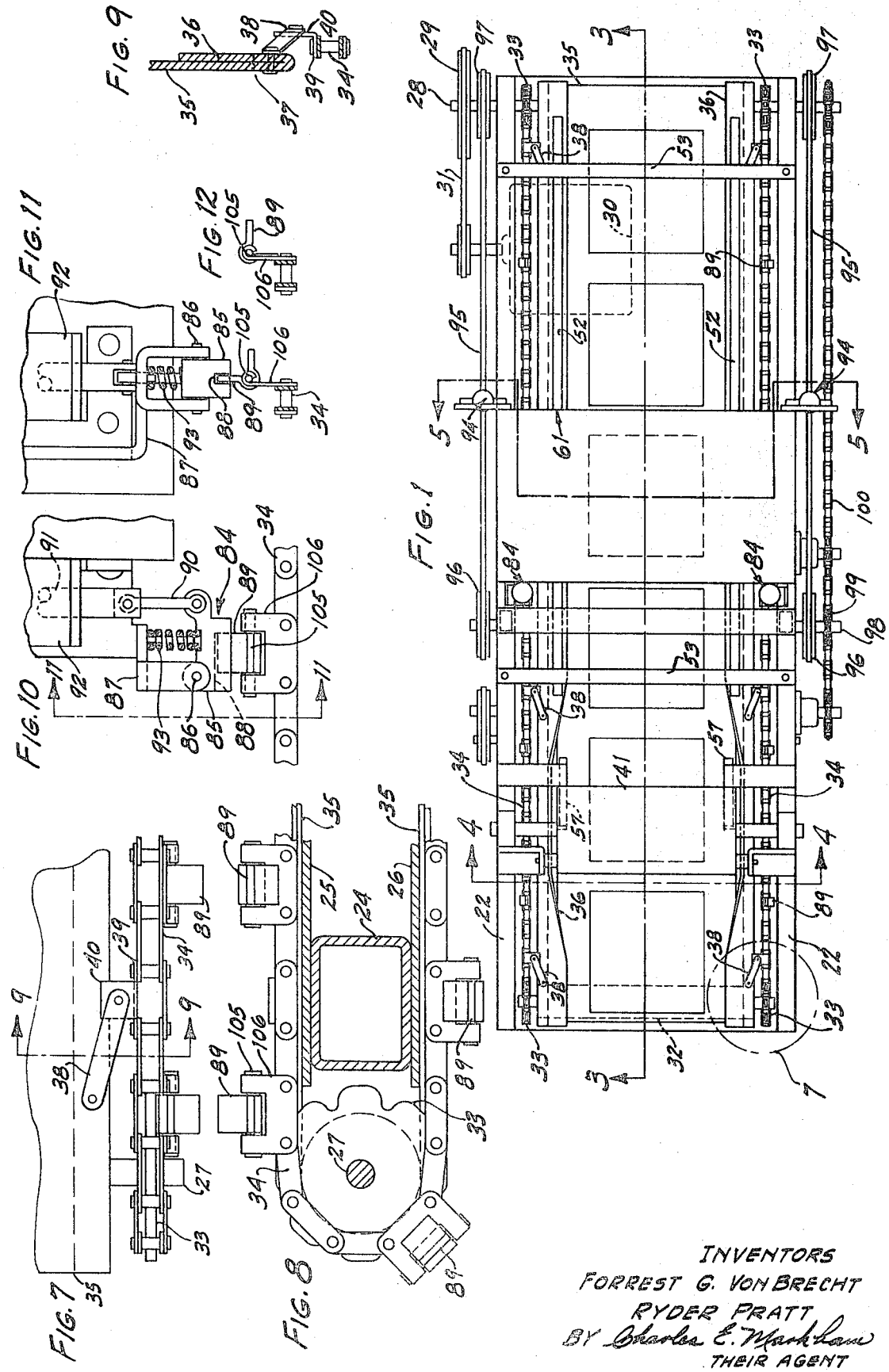
INVENTORS
FORREST G. VON BRECHT
RYDER PRATT,
BY Charles E. Markham
THEIR AGENT

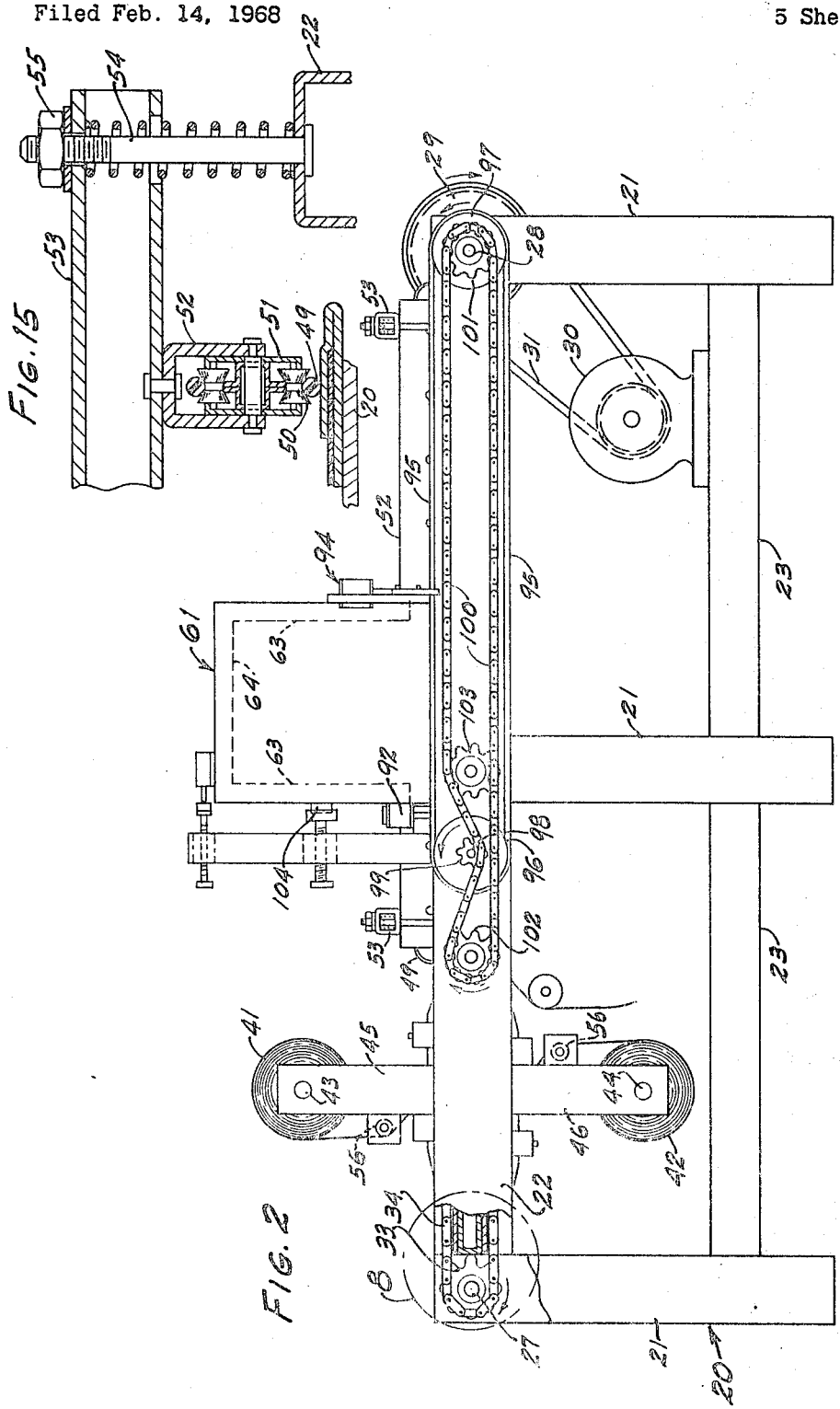

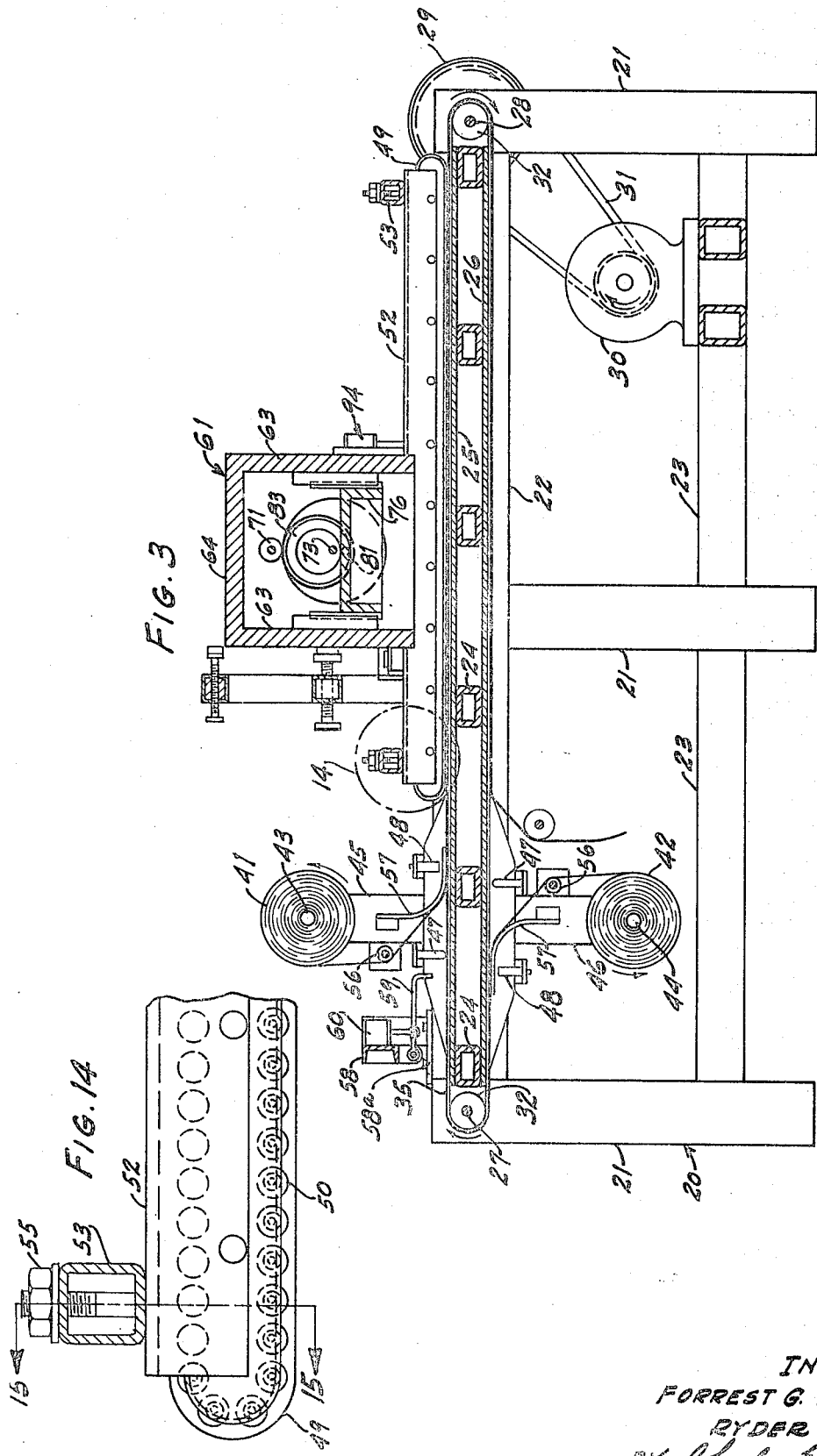

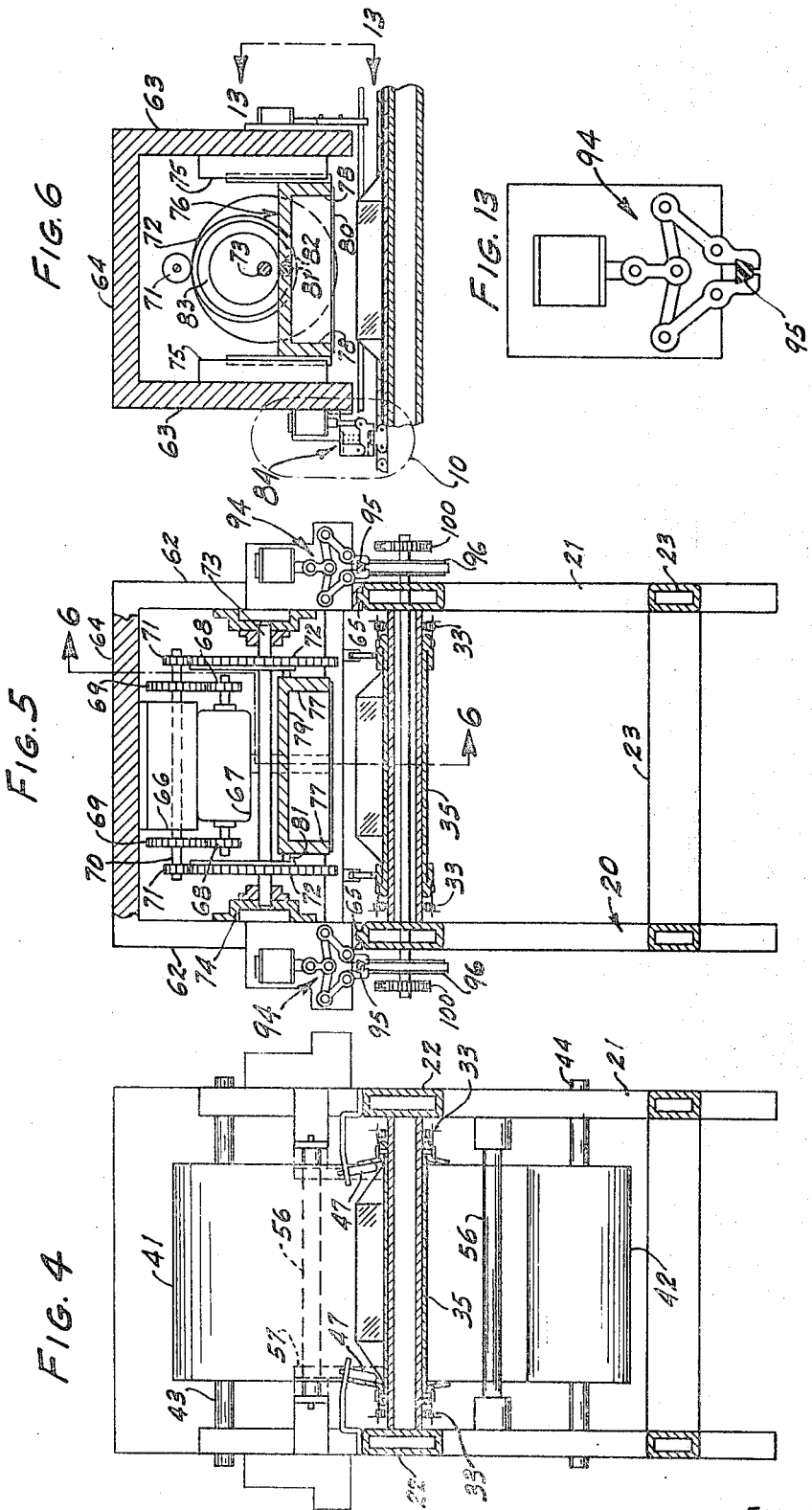

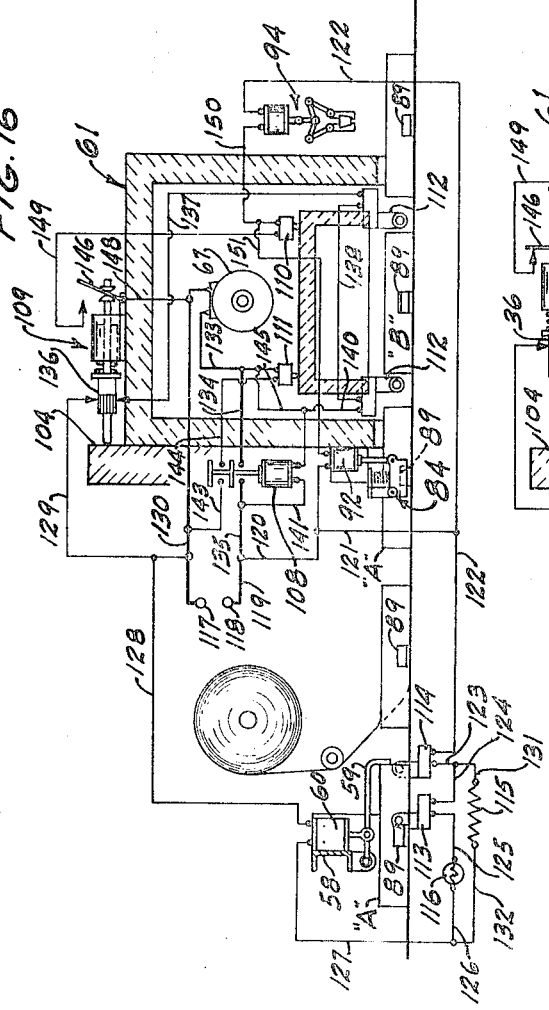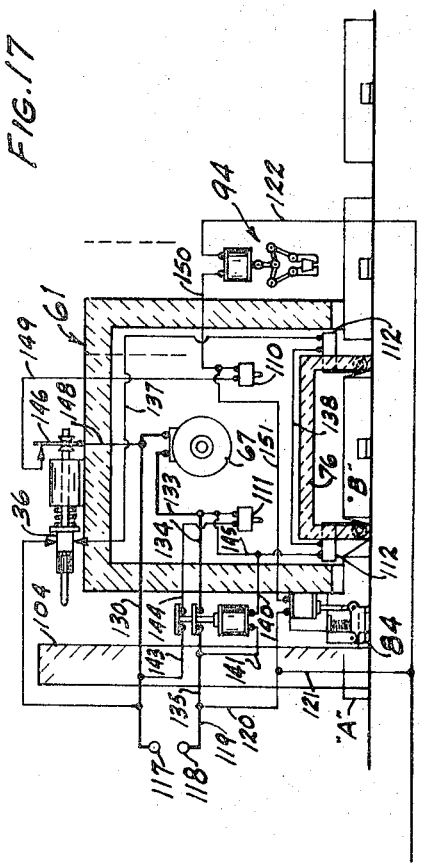

3,543,478
PLASTIC FILM PACKAGING MACHINE
Forrest G. von Brecht, Clayton, and Ryder Pratt, Kirkwood, Mo., assignors to Radec Corporation, a corporation of Michigan
Filed Feb. 14, 1968, Ser. No. 705,411
Int. Cl. B65d 9/12
U.S. Cl. 53—182                12 Claims

ABSTRACT OF THE DISCLOSURE

Packing apparatus in which two plastic films are drawn from rolls and conveyed with the products to be packaged between them over a platten by a continuously driven conveyor belt having means for gripping and holding the films along their sides; and in which a slidably mounted heat sealing device travels forward with the conveyor belt as it functions to heat seal the films around a product and then returns to travel forward with a succeeding product.

---

It has been the practice heretofore in the operation of film packaging apparatus having conveyor means and means for heat sealing plastic films to stop the conveyor and interrupt forward movement of the product and films while the heat sealing means operated to seal the films along lines transverse to the direction of conveyor travel. This method of interrupted operation not only reduces the output rate of the apparatus but also aggravates the ever present problem of maintaining the films in a smooth unwrinkled condition, particularly those readily stretchable soft films in the order of .001 of an inch thick.

The present invention has for an object the provision of a generally new and improved machine for packaging products in which continuously driven conveyor means conveys two continuous film strips with the products to be packaged spaced at intervals between them from a loading area to a heat sealing area wherein heat sealing of the films together along a line completely circumscribing the product is accomplished without interruption or change of speed of the conveyor means, film, or product.

A further object is to provide apparatus for heat sealing plastic films including film conveyor means and a slidably mounted heat sealing device which is engaged by the conveyor means and moved forward with the conveyor and film a predetermined distance from a predetermined point while performing a heat sealing function and is then released from the conveyor means and driven rapidly back to a predetermined point, whereby heat sealing of the films transverse to the direction of travel is accomplished without interruption of the forward movement of the films.

A further object is to provide a plastic film packaging machine having a belt conveyor for gripping and drawing thin, soft, plasic film from a roll and conveying it in unwrinkled condition to a heat sealing station, in which the belt conveyor includes continuous pliable side flaps along both sides thereof which overlie and grip continuous marginal edge portions of the film.

A further object is to provide a plastic film packaging machine having a flexible endless film and product conveyor belt traveling over smooth end rollers, chain means positively driving and interconnecting the end rollers and extending along both sides of said belt, and flexible connectors connecting both edges of the conveyor belt to the adjacent driving chains at spaced points therealong, thereby to provide smooth positive driving means for the belt and maintain accurate alignment of the belt on the smooth end rollers.

A further object is to provide a machine for packaging products in plastic film which is universally adaptable to packaging products of different size by completely heat sealing the products between two heat sealable films while the products and films are in motion.

Further objects and advantages will appear from the following description when read in connection with the accompanying drawings.

In the drawings:

FIG. 1 is a plan view of a packaging machine constructed in accordance with the present invention;

FIG. 2 is a side elevational view of the machine;

FIG. 3 is a longitudinal sectional view of the machine taken on line 3—3 of FIG. 1;

FIG. 4 is a cross-sectional view of the machine taken on line 4—4 of FIG. 1;

FIG. 5 is a cross-sectional view of the machine taken along line 5—5 of FIG. 1;

FIG. 6 is a cross-sectional view of the slidably mounted heat sealing device taken along line 6—6 of FIG. 5;

FIG. 7 is an enlarged fragmentary view taken in the dot-dash circle area designated 7 in FIG. 1;

FIG. 8 is an enlarged fragmentary view taken in the dot-dash circuit area designated 8 in FIG. 2;

FIG. 9 is a fragmentary cross-sectional view taken along line 9—9 of FIG. 7;

FIG. 10 is an enlarged detail view of one of the two driving dog-engaging devices taken in the dot-dash area designated 10 in FIG. 6;

FIG. 11 is a view taken along line 11—11 of FIG. 10;

FIG. 12 is an end view of one of the driving dogs carried by the drive chain and is shown in a non-engageable position;

FIG. 13 is an enlarged elevational view of one of two return belt gripping devices;

FIG. 14 is an enlarged fragmentary detail of one of the conveyor belt flap hold-down devices taken in the dot-dash area designated 14 in FIG. 3;

FIG. 15 is a cross-sectional view taken along line 15—15 of FIG. 14; and

FIGS. 16 and 17 are diagrammatic views of the automatic control system in association with related parts of the machine.

Referring to the drawings, the machine comprises a frame generally indicated at 20 having legs 21, upper horizontal rail members 22, lower longitudinal and transverse tie members 23, and a plurality of transverse cross members 24. Overlying and underlying the cross members 24 are upper and lower plate members 25 and 26, respectively, which extend transversely between the rails 22 and longitudinally the entire length of the rails, see FIG. 3. Journalled in the upper portion of frame 20 and near each end thereof is a shaft. The shaft designated 27 is journalled near the left-hand or loading end of the machine and the shaft designated 28 is journalled in the right-hand or discharge end of the machine. Shafts 27 and 28 both project outwardly at both ends beyond the frame rails 22. Fixed on one projecting end of shaft 28 is a pulley 29 driven by an electric motor 30 through a belt 31. Each of shafts 27 and 28 has fixed to the intermediate portion thereof a smooth belt roller 32 and each of the shafts also has fixed thereto near each end thereof a sprocket wheel 33. Endless sprocket chains 34 extend over each pair of aligned sprockets 33 and positively drive the smooth rollers 32.

Extending over the smooth rollers 32 is an endless flexible conveyor belt 35 which lies against upper and lower plates 25 and 26. The belt 35 is provided with continuous flaps 36 extending along both sides thereof, which may be formed by folding the sides over, as shown in FIG. 9, and stitching as indicated at 37. The flaps 36 may, if desired, be formed as separate strips of suitable flexible material stitched to the sides of the belt. The belt 35 is connected to the sprocket chains 34 along both sides thereof at intervals by flexible straps 38, which straps are attached at one end as by rivets to the belt and at the other end to special sprocket chain links 39 having formed over portions 40 which overlie the belt, see FIGS. 7 and 9. The belt 35 is therefore driven positively through the straps 38 while precluding the transmission of sprocket chain vibrations. The flexible straps 38 also exert a lateral force which maintains the belt 35 in lateral position on the smooth rollers.

Upper and lower film rolls 41 and 42 are mounted for rotation on shafts 43 and 44, respectively, which shafts are journalled in standards 45 and 46, respectively, connected to the side rails 22. The flaps 36 along the sides of conveyor belt 35 are lifted from the belt in the area of the film rolls by prongs 47 and 48, as indicated in FIGS. 1, 3, and 4, to permit entry of the films from both lower and upper rolls. To the right of the film rolls, with reference to FIG. 1, the flaps 36 along both sides of the upper run of the belt are pressed firmly downward on the films by endless round section rubber belts 49, which belts run freely on closely spaced spool-like rollers 50, see FIGS. 14 and 15. The rollers 50 are retained in a race 51 mounted in a channel memer 52 and are free to roll as the rubber belts 49 are moved by frictional contact with the conveyor belt flaps. The channel members 52 are connected near their ends to overlying transverse beams 53 and the beams 53 are in turn connected at their ends to the underlying frame rails 22 by bolts 54 and nuts 55, see FIG. 15.

From the rolls 41 and 42 the films pass over smoothing rollers 56 and then pass between resilient hold-down members 57 and the conveyor belt in the area where the belt flaps are lifted. Referring to FIG. 3, when loading the film preparatory to operation, film from the lower roll 42 is passed around the adjacent smoothing roller 56, under the adjacent hold-down members 57, and under the belt flaps. The conveyor is then operated until a sufficient length of film from the lower roll is withdrawn whereafter film from the upper roll 41 is passed over the adjacent smoothing roll 56 and both films are then passed under the upper hold-down members 57 and forward to a point under the belt flaps.

Mounted on a bridge 58 spanning the conveyor at the left end of the machine is a gate 59 having a solenoid actuator 60. The bridge 58 is longitudinally adjustable along the frame rails 22 on a base 58a. The products to be packaged are loaded on the conveyor belt and on the lower film strip at a point to the left of the gate. As the products are conveyed forward they engage the gate 59, see FIG. 16, and are held there until one of the driving dogs on the sprocket chain comes abreast of the center of the product at which time the gate is lifted.

Slidably mounted on the upper surface of rails 22 is a heat sealing and trimming device generally indicated at 61. The device 61 comprises a box-like casing having vertical side walls 62, vertical front and rear walls 63, and a top wall 64. The side walls 62 are aligned with frame rails 22 and the lower surfaces of these walls are grooved to receive tracks 65 on the upper surfaces of frame rails 22, whereby the casing is slidably guided onto rails 22. Mounted on the underside of top wall 64 is a bracket 66 mounting an electric motor 67. The motor has a drive shaft extending from both ends and carries a pinion gear 68 fixed on each end. The pinion gears 68 mesh with spur gears 69 fixed on a shaft 70 journalled in the bracket 66. Shaft 70 carries fixed at its outer ends pinion gears 71 which engage large spur gears 72 fixed on a shaft 73. Shaft 73 is journalled in bearings 74 mounted on the side walls 62.

Slidably mounted or vertical movement in guides 75 mounted on the inner sides of front and rear walls 63 of the casing is a heat sealing and trimming head 76. Head 76 is of rectangular shape in plan, haivng vertical side walls 77, end walls 78, and a top wall 79. Attached to the lower end surfaces of the vertical side and end walls 77 and 78 is an electrical resistance element 80 forming a complete rectangle. Mounted in each of the side walls 77 of the head 76 is a pin 81 which carries a roller 82. The rollers 82 enter circular grooves 83 formed on the inner faces of large spur gears 72. The circular grooves 83 are eccentric with respect to the spur gear mounting shaft 73 so that, as the spur gears 72 are rotated by motor 67 through the described gear trains, the heat sealing head 76 is reciprocated vertically, see FIGS. 5 and 6. For the purpose of simplifying the illustration, the eccentric grooves 83 in large spur gears 72 are shown circular. However, inasmuch as the gears 72 travel horizontally with the product, the grooves 83 may take any suitable non-circular shape required to provide the necessary dwell of the heat sealing head 76 at its lower limit of travel to provide the time required to heat seal various types of film.

Mounted on the front casing wall 63 of the heat sealing and trimming device 61 is a pair of driving dog engaging devices generally indicated at 84. Referring to FIGS. 10 and 11, the devices 84 each comprise a pivoted dog engaging member 85 pivoted at one end on a pin 86 mounted in a bracket 87 attached to the casing wall 63. The dog engaging members have a slot 88 in the lower surface thereof adapted to receive driving dogs 89 spaced along the sprocket chains 34. The free ends of the dog engaging members 85 are connected by links 90 to the vertically reciprocating plungers 91 of solenoids 92. Springs 93 bias the solenoid plungers and the dog engaging members 85 in a downward dog engaging position, as shown. When the solenoids 92 are energized, the free ends of the dog engaging members 85 are swung upward, releasing the driving dogs 89, and are in a position to permit successive driving dogs to pass freely. When the driving dogs 89 are engaged in the members 85 to the heat sealing device 61 is caused to travel from left to right with the sprocket chain and conveyor belt.

Mounted on the rear wall 63 of the heat sealing device 61, see FIG. 5, are a pair of solenoid operated, belt gripping members generally indicated at 94, which when their actuating solenoids are energized grip horizontal, endless, flexible, V-belts 95 along their upper runs. The flexible V-belts 95 pass over V-groove pulleys 96 and 97. The V-belts 95 are driven in a direction opposite to the travel of the conveyor belt 35 driving pulleys 96. Pulleys 97 are free to turn on shaft 28. The V-belt driving pulleys 96 are fixed on a shaft 98 journalled in the frame rails 22. Also fixed on one end of shaft 98 is a relatively small sprocket wheel 99, see FIG. 2, which engages the upper side of the upper run of an endless sprocket chain 100. The sprocket chain 100 passes over a driving sprocket 101 fixed on shaft 28 at its right end and over a free running sprocket 102 at its left end. An intermediate idler sprocket 103 is interposed between the upper and lower runs of sprocket chain 100 to hold the upper run of the chain in mesh with small sprocket 99. The pulley driving sprocket 99 being considerably smaller than the driving sprockets 101 and 33, and the V-belt pulleys being considerably larger than the driving sprocket 101, the upper runs of V-belts 95 travel from right to left at considerably greater speed than the left to right travel of the upper run of conveyor driving chain 34.

When the solenoid of the V-belt gripping devices 94 is energized, the heat sealing device 61 is caused to travel from right to left to a return position against a stop 104 at a greater speed than it is caused to travel from left to right by the conveyor chain driving dogs 89. The driving dogs 89, see FIGS. 8, 10, and 11, are pivotally mounted on pins 105 carried by specially formed chain links 106. The dogs 89 may be readily rotated from the engaging position shown in FIG. 11 to the non-engaging position shown in FIG. 12, in which position they freely pass the dog engaging devices 84 regardless of its position. As shown in FIG. 8, the driving dogs 89 may be mounted along the conveyor driving sprocket chains 34 at close intervals whereby the spacing between driving dogs set in an engaging position may be varied to accommodate products of different plan dimensions.

Referring to FIGS. 16 and 17, the control system for the automatic operation of the machine will now be described. As primary elements the control system comprises the sealing head driving motor 67, the belt gripping solenoid actuator 94, the driving dog device solenoid actuator 92, a relay 108, a travel control switch 109, a normally open limit switch 110, a momentary break limit switch 111, a pair of photoelectric switching devices which function as product position detectors 112, a normally closed loading gate 59 and its solenoid actuator 60, photoelectric switching devices 113 and 114 for detecting the position of the products and of the driving dogs 89, a current limiting resistor 115 and a timer 116. Terminals 117 and 118 are connected to an electrical power source. The momentary break switch 111 breaks the circuit as its operating pin is pushed slightly in one direction and re-makes the circuit as the pin is pushed slightly farther in the same direction. It does not break as the operating pin returns.

OPERATION OF THE MACHINE AND CONTROL SYSTEM

The loading gate solenoid 60 is connected across the power source from terminal 118 through leads 119, 120, 121, and 122 through photoelectric switching device 113, leads 123 and 124, through photoelectric switching device 114, lead 125, timer 116, leads 126 and 127, the solenoid winding and leads 128, 129, and 130 to terminal 117. The resistor 115 is connected across switching device 114 and timer 116 by leads 131 and 132. The timer 116 may take the form of an incandescent lamp which will permit a momentary current flow therethrough which, with the current permitted to flow parallel thereto through resistor 115, is sufficient to pull in solenoid 60 and lift gate 59. Once the solenoid 60 has been pulled in the current permitted to flow through resistor 115 will alone hold in the solenoid.

When films from the rolls 41 and 42 have been threaded and placed under the closed flaps of the upper belt run and the motor 30 is driving the sprocket chain 34 and belt 35, products are placed on the conveyor belt to the left of loading gate 59. When the product designated A reaches gate 59 it is stopped and held. In this position the leading edge of the product A will be interrupting the beam of photoelectric switching device 114 causing it to close. When one of the driving dogs 89 on chain 34 subsequently reaches a predetermined relationship with the stationary product A (in this case the center of the product), it will interrupt the beam of photoelectric switching device 113 causing it to close. The closure of both 113 and 114 momentarily completes a pull-in circuit for solenoid 60 causing the gate to be lifted and permitting the product to travel with the driving dog. The solenoid 60 will remain pulled in through resistor 115 and the gate 59 lifted until the product A completely passes the beam of photoelectric device 114, whereupon the gate will again close.

If the product A had been loaded at such time that a driving dog 89 would have intercepted the beam of photoelectric switching device 113 before the product A reached the gate and intercepted the beam of photoelectric switching device 114, the gate would not have lifted upon the passing of this dog, but would have remained closed until the following driving dog intercepted the beam of device 113. The resistance of timer 116 after a short period of time, in the order of one second, reaches a value which prevents sufficient current flow, together with that flowing through resistor 115, to effect a pull in of solenoid 60.

When the driving dog 89, which is traveling in correct position with product A, encounters the driving dog engaging device 84, the heat sealing and trimming device 61 is caused to travel with the sprocket chain 34 and consequently with the product A and the conveyor belt. The product A will not at this time be under the sealing head 76, but the preceding product B, traveling in a predetermined correct relationship with the preceding driving dog 89, will be aligned under the sealing head 76 at this time.

If the preceding product B is correctly centered under sealing head 76 at the time the driving dogs traveling with product A engage the dog engaging devices 84, the beams of normally closed, series connected, photoelectric switching devices 112 will not be interrupted by the product B and the relay 108 will be energized, thereby completing a circuit for energization of the sealing head driving motor 67. The motor energizing circuit extends from terminal 117, through a lead 130 to the motor 67, through leads 133 and 134, through the lower relay contacts and a lead 135 to terminal 118. The energizing circuit for relay 108 extends from terminal 117 through lead 130, lead 129, through spring pressed slidable switch bar 136 of switching device 109, through lead 137, through photoelectric switching devices 112 and their connecting lead 138, through lead 140, the relay winding, and leads 141 and 135 to terminal 118. A holding circuit for relay 108 is also completed upon closure of the relay. This circuit extends from terminal 117 through lead 130, lead 143, the upper contacts of relay 108, a lead 144, momentary break switch 111, a lead 145, relay winding 108, lead 141, and lead 135 to terminal 118.

The sealing and trimming head 76 will now move downward to seal the upper film to the lower film completely around product B and at the same time burn through and sever the package from the film strips as the product B and device 61 travel together with the conveyor. After completing the sealing and trimming the head 76 again moves upward. Very near the upper limit of its travel, it engages the normally open switch 110 causing it to close, and at the same time, it engages the momentary circuit break switch 111, thereby momentarily breaking the holding circuit for relay 108. The relay 108 now drops out because its pull-in circuit, completed through sliding switch bar 136, is also now broken due to the fact that the conductive portion of sliding switch bar 136 has moved by the spring force to the left, as in FIG. 17. The leftward movement of switch bar 136 also causes the leftward swing of a switch blade 146 to close with a contact.

The earlier closure of switch blade 146 and the later closure of upper travel limit switch 110 together complete a circuit for energization of the solenoid actuators of the belt gripping devices 94 and the energization of the parallel connected solenoid actuators 92 of the dog engaging devices 84. The energizing circuit for solenoid actuators 94 is traced from terminal 117 through leads 130 and a lead 148, through switch blade 146, a lead 149, normally open limit switch 110, a lead 150, the solenoid winding 94 and leads 122, 121, 120, and 119 to terminal 118. The actuation of these devices effects the simultaneous release of the dog engaging devices 84 and the gripping of the return V-belts 95 so that the device 61 now travels rearwardly to the stop 104. When stop 104 is reached the contact bar 136 is moved toward the right by engagement therewith, thereby swinging switch blade 146 toward the right to break the circuit for solenoid actuators 94 and 92. The belt gripping devices are therefore released and the driving dog devices are returned downward by spring pressure to dog engaging position.

If it should occur that product B is sufficiently out of position so as to intercept either of the beams of photoelectric devices 112 at the time the driving dog 89 traveling with product A engages the dog engaging device 84, the initial slight forward travel of the device 61 will break the energizing circuit for relay 108 at the point 136, thereby precluding the operation of sealing head motor 67. Under such conditions the device 61 will continue travel forward slightly farther until the switch blade 146 closes, at which time solenoids 92 and 94 will be energized causing device 61 to return to stop 104 where it will await the engagement of the next driving dog succeeding the one traveling with product A, and if at this time product A is in the correct position under sealing head 76, the machine will continue operation in a normal manner.

After the product passes the heat sealing area, it is conveyed to the right end of the machine from where it is removed. The remaining scrap film continues beyond the heat sealing area around the right-hand roller 32 and along the bottom run of the conveyor belt until it arrives at the point at which the belt flaps 36 are lifted by prong 47. At this point the scrap leaves the belt and may be disposed of in any suitable manner.

The driving dogs 89 are closely spaced along the sprocket chains 34, as shown in FIG. 8. When the driving dogs are turned down in inoperative position, as shown in FIG. 12, they pass the photoelectric switching device 113 without interrupting its beam and pass freely under the driving dog engaging devices 84. The frequency of occurrence along the chains at which the driving dogs are turned upward in an operative engaging position is selected to accommodate the longitudinal dimension of the products to be packaged. The photoelectric switching devices 112 and 114 and their respective light beam sources and the product gate 59 are longitudinally adjustable to accommodate longitudinal dimension variations of the products. The photoelectric switching device 113 and its light beam source remain stationary. The only change in parts necessary to accommodate a considerable range of product sizes is the substitution of suitably sized heat sealing heads 76 whenever the product size or shape is changed.

It will be apparent that as the vertical dimension of the product is increased more film will be required to form the vertical sides of the product package. To the extent that the upper film is stretchable without being unduly stressed as it is forced downward by the sealing head, it will accommodate an increased thickness of the product. However, if the product to be packaged exceeds this thickness or if the upper film is substantially rigid or unstretchable an upper film blank of the size and shape required to form the top and sides of the package may be cut from the continuous upper film strip by a knife or hot wire attached to and surrounding the head 76 and arranged so as to cut the blank as the descending head 76 begins to stress the film.

Applicant has found that an upper film considerably wider than the conveyor belt may be used and readily folded along both sides as it is pulled from the roll, the folds being stored under the film gripping flaps. Thus, if the hold-down pressure on the flaps is made moderate these folds may be pulled from the flaps as the sealing head descends, thereby providing additional material for the two side walls of a package of increased thickness. Also, inasmuch as the greater central portion of the film on the forward side of the product being packaged has been blanked out in trimming the preceding product package, there is little or no resistance to the forming of the forward side wall of the package and there remains, therefore, only the film at the rear side of the product being packaged which would need to be cut to relieve undue stressing. Cutting the film transversely at a suitable distance to the rear of the product being packaged can readily be accomplished with a hot wire traveling downward with the head 76.

In order to avoid any slow-down of the conveyor belt due to friction which may occur between it and the underlying platten 25 as a result of downward pressure of head 76, applicant contemplates providing a longitudinally movable platten portion underlying the heat sealing device 61 which is connected to and travels to and fro with the device 61.

We claim:

1. In a machine of the kind described, a frame, a conveyor belt, constant speed driving means driving said belt, a heat sealing device comprising a carriage mounted on said frame for movement parallel with said belt and including a head mounted therein for reciprocation perpendicular to said belt and operative in its stroke toward said belt to perform a heat sealing function, stop means limiting movement of said carriage opposite the travel of said belt, means driven by said driving means and including forward drive connection means periodically engaging said carriage to move it forward with said belt at conveyor belt speed when said forward drive connecting means is operative, reverse drive means driven by said driving means including reverse drive connecting means for moving said carriage rearward when said reverse drive connecting means is operative, independent means for driving said reciprocating head, means rendered operative when said carriage is moved rearward into engagement with said stop means to render said forward drive connecting means operative, to render said reverse drive connecting means inoperative, and to render said independent means operative to drive said head through one reciprocating cycle, and means rendered operative upon the completion of a reciprocating cycle of said head to render said forward drive connecting means inoperative and said reverse drive connecting means operative.

2. A machine as set forth in claim 1 in which motion multiplying means between said constant speed driving means and said reverse drive means causes said carriage to be moved rearward at a greater speed than it is moved forward.

3. In a machine for packaging products in heat sealable plastic film, a frame, a conveyor belt for advancing the film and products forward from a loading station to a heat sealing area, a platten underlying said belt, constant speed driving means driving said belt, a heat sealing device comprising a carriage mounted on said frame for linear movement parallel with said belt travel and including a head mounted therein for reciprocation perpendicular to said belt and operative to perform a heat sealing function in its stroke toward said belt, stop means positioned forward of said loading station for limiting rearward travel of said carriage, spaced driving dogs driven by said driving means and moving with said conveyor belt periodically engaging said carriage to move it forward at conveyor belt speed, releasable driving dog engaging means on said carriage, reverse drive means for moving said carriage rearward, releasable reverse drive connecting means on said carriage, independent drive means for driving said reciprocating head, means rendered operative when said carriage is moved rearward to said stop means to render said dog engaging means operative, to render said reverse drive connecting means inoperative, and to render said independent drive means operative to drive said head through one reciprocating cycle, means rendered operative upon the completion of a reciprocating cycle of said head to render said dog engaging means inoperative and to render said reverse drive connecting means operative, means at said loading station to position products on said conveyor belt in such predetermined longitudinal relationship with said driving dogs that their registry under said sealing head coincides with the engagement of said driving dogs with said dog engaging means when said carriage is in its rearward stopped position, and the spacing of said driving dogs being such that the intervals between their periodic engagements with said carriage is sufficient to permit the forward and return cycle of said carriage to occur.

4. A machine as set forth in claim 3 in which the spacing of the driving dogs is such that the intervals between their periodic engagements with said carriage are slightly greater than the forward and return cycle time of said carriage, in which means responsive to the registry of a product under said head is provided, and in which the independent means driving said reciprocating head is rendered operative jointly by the means rendered operative by return of the carriage to said stop member and by the response of said means responsive to the registry of a product under said reciprocating head.

5. A machine as set forth in claim 3 in which the conveyor belt is a flexible endless belt passing over smooth end rollers, in which belt driving sprocket chains driven by said driving means travel parallel with and adjacent both sides of both runs of said belt, and in which said belt is positively driven in one direction by said chains through flexible straps connecting the edges of the belt to the adjacent chains at spaced intervals therealong.

6. A machine as set forth in claim 5 in which said driving dogs are mounted on said driving sprocket chains at equally spaced intervals therealong.

7. A machine as set forth in claim 6 in which said driving dogs are mounted on specially formed sprocket chain links, in which said dogs are manually movable between operative positions in which they drivingly engage said dog engaging means and inoperative positions in which they freely pass said dog engaging means whereby the frequency of periodic engagement of the carriage may be varied.

8. A machine as set forth in claim 3 in which said reciprocating head is provided with heat sealing and trimming elements whereby the head performs a heat sealing and trimming function in its stroke toward said conveyor belt.

9. A machine as set forth in claim 3 in which two continuous film strips are laid upon the conveyor belt at spaced points therealong, in which the products to be packaged are placed upon the first film laid, the other film overlying the product as it is advanced by the belt, in which the reciprocating head completely surrounds a product in registry thereunder whereby the overlying film is formed over the product and pressed against the underlying film on a line completely circumscribing the product as said head moves in its stroke toward said conveyor belt.

10. A machine as set forth in claim 3 in which said means at the loading station for positioning products on said belt in predetermined relationship with said driving dogs comprises a normally closed gate for arresting forward movement of a product on said belt, an actuator for opening said gate and means responsive to the presence of a driving dog when it moves forward to a predetermined longitudinal relationship with said gate to render said actuator operative to open said gate and permit a product being detained by said gate to travel forward in said predetermined relationship with the driving dog.

11. In a machine for packaging products between two continuous strips of plastic film, a frame, a conveyor belt for advancing the film strips and products to be packaged placed thereon in a forward direction, a platten underlying said belt, drive means driving said conveyor belt at constant speed, continuous flexible film holding flaps extending along and overlying marginal portions of both sides of said belt adapted to overlie and grip marginal side portions of films lying on said belt, a film sealing device comprising a carriage slidably mounted on said frame for movement parallel with said conveyor belt and including a sealing head mounted therein for reciprocation perpendicular to said belt and operative in it's stroke toward said belt to perform a film sealing function, a stop limiting the rearward travel of said carriage, means driven by said drive means rendered operative to drive said carriage forward with said conveyor belt at conveyor belt speed when a product to be packaged is advanced by said conveyor belt into registry with said sealing head, means operative to drive said sealing head through a reciprocating cycle during the forward movement of said carriage, and means rendering operative upon completion of the reciprocating cycle of said sealing head to return said carriage to said stop.

12. A machine as set forth in claim 11 in which said conveyor belt is an endless flexible belt with parallel upper and lower horizontal runs, in which said platten is fixed and extends substantially the length of said upper run of said belt, and which machine further includes a short movable platten underlying said belt and attached to said carriage and moveable therewith.

References Cited
UNITED STATES PATENTS 3,022,618  2/1962  Schwartz et al. _____ 53—180 X
3,193,978  7/1965  Bader _____ 53—282 X TRAVIS S. McGEHEE, Primary Examiner